Patented June 15, 1943

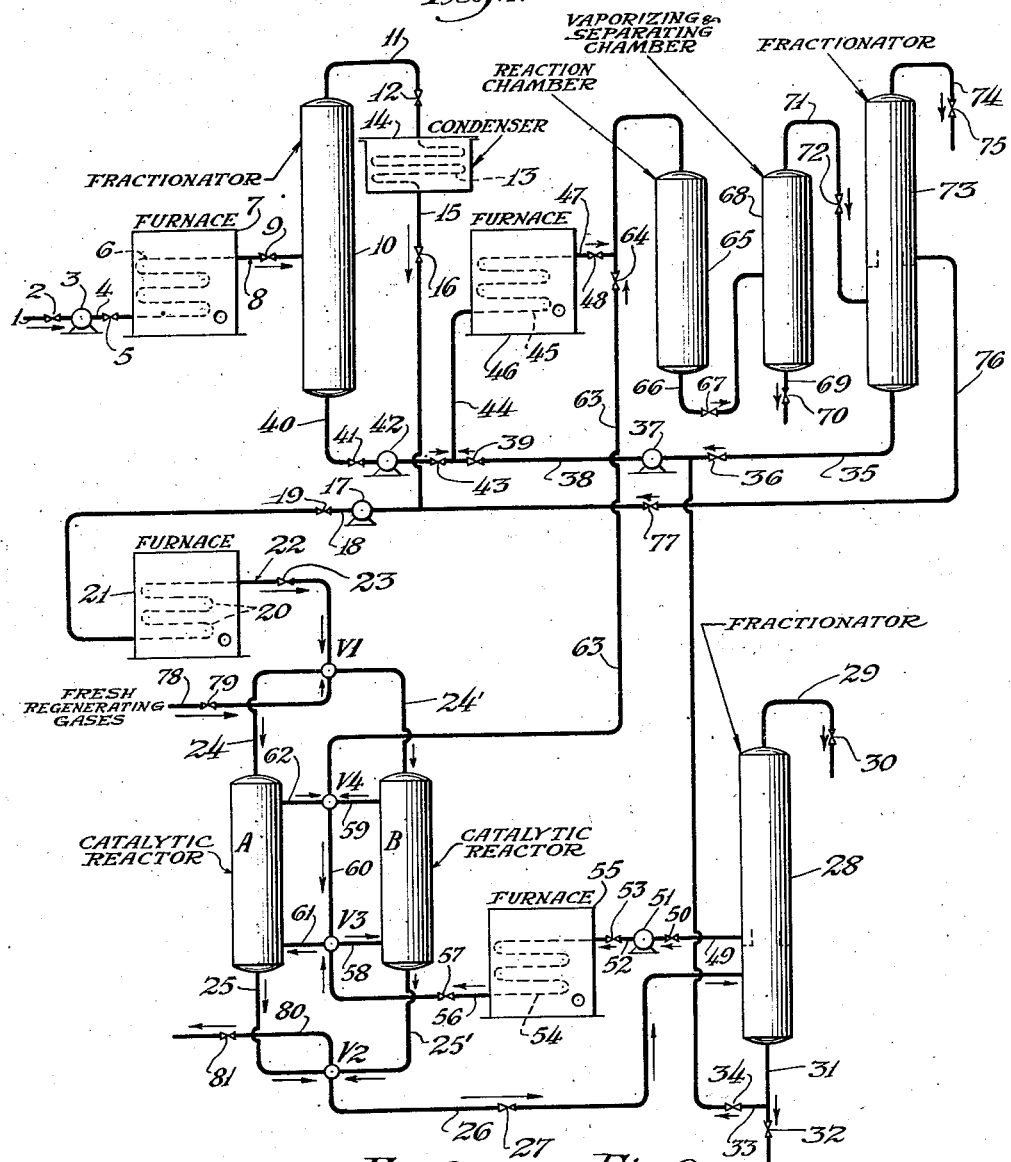

2,321,972

UNITED STATES PATENT OFFICE 2,321,972

HYDROCARBON CONVERSION PROCESS

Wayne L. Benedict, Chicago, Ill., assignor to Universal Oil Products Company, Chicago, Ill., a corporation of Delaware Application December 5, 1940, Serial No. 368,607

3 Claims. (Cl. 196—52)

This application is a continuation-in-part of my co-pending application Serial No. 309,716, filed December 18, 1939.

This invention relates to an improved method for converting hydrocarbon oils into more valuable hydrocarbons. More specifically, it is concerned with a process which involves both thermal and catalytic cracking treatments wherein intermediate conversion products formed in the catalytic cracking treatment are employed as the heat convective medium in supplying heat to the catalytic conversion reaction and in cooling the catalyst undergoing regeneration.

A common practice in the catalytic treatment of hydrocarbons is to employ an extraneous material, such as combustion gases, molten salts, or some other suitable fluid medium, to supply heat to and to conduct heat from the endothermic and exothermic reaction zones, respectively. Generally speaking, however, there are certain disadvantages which accompany an operation employing heat convective media of the type which have found commercial application. On the one hand, the coefficient of heat transfer of the materials and, more specifically, combustion gases is relatively low, and on the other hand material, such as molten salts, in most cases, is, relatively speaking, very corrosive, and therefore the materials mentioned either from the standpoint of heat transfer or corrosion render the operation involving the catalytic treatment of hydrocarbons considerably more expensive than a thermal cracking treatment. Liquids, generally speaking, have a higher coefficient of heat transfer than gases. However, due to the relatively high temperature employed in the catalytic reactions, molten salts are the only liquid materials which have found any great application, largely due to the fact that extremely high temperatures may be encountered before any decomposition takes place. These materials, therefore, would be the most desirable if it were not for excessive corrosion encountered in the equipment.

In order to obviate the disadvantages inherent in a catalytic cracking process employing heating or cooling media of the types referred to above, but at the same time obtain results comparable with or better than those obtained from systems employing such media, my invention provides for utilizing intermediate products formed in the process in conducting heat from the exothermic reaction zone and conveying heat to the endothermic reaction zone.

In the catalytic step of my process two or more reaction zones are employed, the fresh or freshly regenerated catalyst in one or more zones being used for effecting conversion of the hydrocarbons subjected to contact therewith, while the catalyst in the other zone or zones is undergoing regeneration by contacting therewith oxygen-containing gases which are used in burning from the catalyst carbonaceous substances deposited thereon. In order to effect the desired heating and cooling in the respective reactors, I prefer to cool the exothermic reaction zone by contacting therewith the intermediate conversion products from the catalytic treatment at the desired temperature level and supplying heat to the endothermic reaction zone by contacting therewith the said intermediate conversion products from the exothermic reaction zone. Intermediate conversion products formed in a catalytic cracking treatment are known to be refractory and capable of withstanding extreme temperatures and pressures with relatively low rates of cracking. These materials may be employed successfully, therefore, as the heat convective medium with little danger of extreme excessive coking on the external surfaces of the reaction zone.

In one specific embodiment the invention comprises fractionating a hydrocarbon oil into light and heavy fractions, subjecting said heavy fraction together with at least a portion of insufficiently converted hydrocarbons formed as hereinafter described to a thermal conversion step, subjecting said light fraction together with a portion of insufficiently converted hydrocarbons formed as hereinafter described to a catalytic conversion step, fractionating the resultant products from each conversion step to separate desired products and insufficiently converted hydrocarbons, passing a portion of said insufficiently converted hydrocarbons from said catalytic conversion step in indirect heat exchange relationship with said catalytic conversion step and thereafter supplying them to said thermal conversion step, subjecting the remaining portion of said insufficiently converted hydrocarbons from said catalytic conversion step and the aforesaid heavy fraction of the charging oil together with at least a portion of said insufficiently converted hydrocarbons from said thermal conversion step to treatment in said thermal conversion step, subjecting a portion of said insufficiently converted hydrocarbons from said thermal conversion step to treatment in said catalytic conversion step, and subjecting another portion of said insufficiently converted hydrocarbons from said thermal conversion step to further treatment in said thermal conversion step.

Figure 1 in the accompanying drawing illustrates diagrammatically in side elevation one specific form of the apparatus which may be employed embodying the broad features of the invention.

Figures 2 and 3 are details of the four-way inlet and outlet valves diagrammatically indicated in Figure 1, Figure 2 showing a valve in one position, and Figure 3 showing the passageways therethrough shifted.

Referring now to the drawing, charging oil for the process, which may comprise topped crude oil or any desired fraction thereof, is introduced through line 1, containing valve 2, into pump 3, line 4, containing valve 5, into heating coil 6, wherein a portion thereof is vaporized and raised to the desired temperature without substantial pyrolytic cracking being effected, heat being supplied to the oil passing therethrough from furnace 7. The heated material from heating coil 6 is conducted through line 8, containing valve 9, into fractionator 10, wherein it is fractionated to separate a vaporous light fraction and a non-vaporous heavy fraction. Said vaporous light fraction is removed through line 11, containing valve 12, into condenser coil 13 contained in condenser box 14 wherein it is condensed, withdrawn through line 15, containing valve 16, and commingled in line 76 with the intermediate conversion products formed in the thermal conversion step, as hereinafter described. The mixture, which is preferably of such properties that it is substantially vaporized at conditions employed in catalytic cracking, is introduced into pump 17 and line 18, containing valve 19, into heating coil 20, wherein it is raised to the desired conversion temperature without substantial pyrolytic cracking being effected, heat being supplied to the oil passing therethrough from furnace 21. The vapors from heating coil 20 are conducted through line 22, containing valve 23, into valve V1, after which the vapors are subjected to treatment in a manner to be described more fully later.

In the particular case here illustrated, two reactors, A and B, are employed and each reactor preferably contains a plurality of relatively small diameter tubes containing catalytic material capable of promoting the desired cracking reaction when in a fresh or freshly regenerated state. In addition, each reactor is preferably equipped with a means for introducing a fluid heating or cooling medium around the tubes for the purpose of supplying heat to, or withdrawing heat from, the reaction zone. It is not intended that the invention should be limited in this respect, however, for I may employ, if so desired, reactors of the type wherein the catalyst surrounds the tubes and the heating or cooling medium flows through the tubes. One reactor is at all times employed as a cracking zone while the catalyst in the other reactor is being regenerated by passing therethrough a stream of relatively inert gases (such as combustion gases, for example) containing controlled amounts of air or oxygen. The reactors are alternately operated with respect to the service for which they are employed by means of valves V1 and V2 through which the reactants and the regenerating gases are supplied and withdrawn, and by means of valves V3 and V4 through which intermediate conversion products employed as a heating and cooling medium are directed. Any suitable valve arrangement capable of switching the direction of flow of the stream of reactants and the stream of regenerating gases may be employed within the scope of the invention, and, for the sake of simplifying the description and illustrating the process without unnecessary complications, each of the switching valves is here illustrated as a single four-way valve in which the position of the two passageways therethrough may be shifted as illustrated in Figures 2 and 3.

Assuming that valves V1, V3, and V4 are each adjusted to the position illustrated in Figure 2 and valve V2 is adjusted to the position illustrated in Figure 3, the hydrocarbon vapors in line 22 pass through valve V1 into line 24 and thence into reactor A where they are contacted with a suitable catalytic material contained therein. While the hydrocarbon vapors are in contact with the catalytic material, the endothermic heat of conversion is supplied to the vapors being converted in the manner to be described more fully later.

The preferred cracking catalysts for use in the present process consist in general of a precipitated alumina hydrogel and/or zirconia hydrogel composited with silica hydrogel, the gel composite being washed, dried, formed into particles, and calcined to produce a catalyst mass. The invention, however, is not limited to these particular catalysts, for other catalysts such as, for example, the hydrosilicates of alumina, acid treated clays, and the like, may be used within the broad scope of the invention.

In the following specification and claims the terms silica-alumina, silica-zirconia, and silica-alumina-zirconia masses are used in the broad sense to designate the synthetic composites referred to above. The preferred catalysts may be prepared by precipitating silica from a solution as a hydrogel, within or upon which the alumina and/or zirconia is deposited also by precipitation as hydrogels. The silica hydrogel may be prepared conveniently by acidifying an aqueous solution of sodium silicate by the addition of a required amount of hydrochloric acid. After precipitating, the silica gel is preferably washed until substantially free from alkali metal salts. The washed silica hydrogel is then suspended in a solution of aluminum and/or zirconium salts and an alkaline precipitant, such as ammonium hydroxide, ammonium carbonate, or ammonium sulfide, is added to the solution to precipitate aluminum and/or zirconium hydrogels. The final precipitate, comprising essentially hydrated silica and hydrated alumina and/or zirconia, is washed to substantially completely remove water soluble materials, and dried at about 300° F. to produce a rather crumbly and granular material which may be ground and pelleted or sized to produce particles of catalyst, after which the catalyst particles are calcined at a temperature in the range of approximately 1000–1506° F. Various other procedures such as, for example, co-precipitation of the hydrated gels may be employed, when desired, to produce the preferred catalyst.

Cracking temperatures, preferably of the order of 600–1000° F. more or less, and pressures ranging, for example, from substantially atmospheric to 200 pounds or more per square inch superatmospheric may be employed when using the preferred catalyst, although the process is not limited to this range of conditions exactly.

While the hydrocarbon conversion reaction is being accomplished in reactor A the catalyst in reactor B may be subjected to regeneration treatment by contacting therewith a suitable inert gas such as combustion gas containing controlled amounts of air or oxygen. Fresh regenerating gases are introduced to the system through line 78, containing valve 79, by means of which they are conducted to valve V1 wherethrough they pass into line 24' and thence into reactor B.

The carbonaceous substances deposited upon the catalyst in the previous processing period are burned therefrom and the exothermic heat of regeneration is absorbed by the cooling oil introduced, as hereinafter described. Spent regenerating gases from reactor B are directed through line 25' to valve V2 wherethrough they pass into line 80, containing valve 81, after which the gases may be exhausted or, when desired, the sensible heat from the gases may be recovered in suitable equipment, not shown, and air or oxygen commingled with the resulting cooled gases and the mixture thereafter returned to reactor B as the fresh regenerating gases.

The conversion products from reactor A are directed through line 25 into valve V2 wherethrough they pass into line 26, containing valve 27, into fractionator 28. The conversion products supplied to fractionator 28 are fractionated therein to separate vapors boiling substantially in the gasoline range from the higher boiling intermediate conversion products and heavy conversion products, both of which are condensed in the fractionating zone.

The fractionated vapors separated in fractionator 28 are directed through line 29, containing valve 30, to the conventional condenser and receiver, not shown, wherein the normally gaseous products are substantially separated from the gasoline boiling range hydrocarbons. A portion of the gasoline boiling range hydrocarbons collected in the receiver may be returned to the upper portion of fractionator 28 by well-known means, not shown, as a refluxing and cooling medium, and the residual portion of the gasoline boiling range hydrocarbons are removed from the receiver as a product of the process. The heavy conversion products are withdrawn through line 31, a portion of which may, if desired, be withdrawn through valve 32 and subjected to any further treatment. All or the remainder of the heavy conversion products is conducted through line 33, containing valve 34, following which it is commingled with the heavy conversion products from the thermal conversion step in line 35, and the resulting mixture is directed through line 35, into pump 37, and line 36, containing valve 39, wherein they are commingled, in line 44, with the non-vaporous heavy fraction of the charging oil condensed in fractionator 10 and withdrawn through line 40, containing valve 41, into pump 42 and line 38, containing valve 43. This mixture is then directed through line 44 into heating coil 45 wherein it is heated to the desired conversion temperatures which may range, for example, from 850–1000° F. and is preferably maintained at this temperature within heating coil 45 for a sufficient period of time to effect substantial thermal cracking, heat being supplied from furnace 46. The resultant conversion products are then withdrawn through line 47, containing valve 48, and are commingled in line 63 with the intermediate conversion products from the catalytic conversion step which have been used as the heat exchange medium, as hereinafter described.

The intermediate conversion products from the catalytic conversion step, separated and condensed in fractionator 28, are withdrawn through line 49, containing valve 50, into pump 51, line 52, containing valve 53, into heating coil 54, wherein they are heated, heat being supplied by furnace 55, to a temperature sufficient to initiate combustion of carbonaceous substances, particularly when the heated intermediate conversion products are brought into contact with the reaction zone in which the catalyst is undergoing regeneration. The heated products leaving heating coil 54 are directed through line 56, containing valve 57, to valve V3, wherethrough they pass into line 58 and thence into reactor B wherein they are contacted with the exterior of the reaction charge, thereby absorbing a substantial portion of the heat produced in the regeneration reaction. The intermediate conversion products, leaving reactor B, having a higher heat content than the entering material are directed through line 59 and valve V4 wherethrough they pass into line 60, and then through valve V3 into line 61 by means of which they are introduced to reactor A, wherein they are contacted with the exterior of the reaction zone in which the reactants are undergoing conversion. A portion of the heat contained in the intermediate conversion products is imparted to the reactants undergoing conversion in reactor A, thereby supplying a substantial portion of the heat of conversion thereto. The intermediate conversion products leaving reactor A are directed through line 62 to valve V4 wherethrough they pass into line 63, containing valve 64, and are subsequently commingled with the products from heating coil 45, introduced through line 47, as previously described.

The resulting mixture is conducted through line 63 into reaction chamber 65 which is preferably maintained at substantially the same, or at a slightly reduced, pressure relative to that employed on the outlet of heating coil 45 and which is preferably insulated to reduce radiation losses therefrom although no insulation appears in the drawing.

The resulting conversion products leaving reaction chamber 65 are conducted through line 66, containing valve 67, into vaporizing and separating chamber 68 which is preferably operated at a reduced pressure relative to that employed on the outlet of reaction chamber 65, which may range, for example, from 50 to 200 pounds or more per square inch. The vaporous conversion products are separated from the liquid conversion products in chamber 68 and the latter, due to the reduction in pressure, is subjected to substantial further vaporization to form a non-vaporous liquid residue which is removed from chamber 68 by way of line 69, containing valve 70, cooled and recovered as a product of the process or subjected to any desired further treatment. Vaporous conversion products, together with vapors evolved in chamber 68, are conducted through line 71, containing valve 72, into fractionator 73 wherein they are fractionated to separate vaporous hydrocarbons boiling substantially in the gasoline range from the higher boiling oils. The fractionator vapors are withdrawn through line 74, containing valve 75, into the conventional condenser and receiver system, not shown, wherein the gasoline boiling range hydrocarbons are condensed and are substantially separated from the normally gaseous hydrocarbons. A portion of the gasoline boiling range hydrocarbons collected in the receiver may be returned to the upper portion of fractionator 73 by well-known means, not shown, as a refluxing and cooling medium and the residual portion of the hydrocarbons removed from the receiver and recovered as a product of the process.

Fractionator 73, together with the condensing and collecting equipment connected therewith, is preferably operated at substantially the same or at a slightly reduced pressure relative to that employed in chamber 68 although pressures down to substantially atmospheric may be used.

The intermediate conversion products are withdrawn through line 76, containing valve 77, and are thereafter commingled with the light fraction of the charging oil prior to introduction to the catalytic conversion step, as previously described. The heavy conversion products, condensed in fractionator 73, are withdrawn through line 35, containing valve 36, and are subsequently commingled with a portion of the heavy conversion products formed in the catalytic conversion step, as previously described.

In the catalytic cracking operation, as described above, when the catalyst in reactor A approaches a state of reduced activity, at which time it is advantageous to apply freshly regenerated catalyst for the treatment of the vapors, the supply of air to the regenerating gas stream is momentarily discontinued so that reactor B is purged of oxygen-containing gases, and after the purging in reactor B is completed, valve V1 is switched to the position in Figure 3 at which time oxygen-free gases are introduced to reactor A and hydrocarbon vapors to reactor B. After a lag corresponding to the time required to drive the vapors from reactor A and the oxygen-free gases from reactor B, valve V2 is switched to the position indicated in Figure 2 at which time oxygen is again admitted to the regenerating gas stream.

Either prior to, simultaneously with, or subsequent to the switching of valve V1 and V2, valves V3 and V4 may be switched to the position indicated in Figure 3 in order that the proper heating and cooling may be effected in reactors A and B. After the switching of valves V1, V2, V3, and V4 the flow of hydrocarbon vapors in line 22 will be through valve V1 into line 24' and thence to reactor B while the flow of conversion products from reactor B will be through line 25', valve V2, and line 26. The flow of conversion products from this point on will be substantially as described. The flow of the fresh regenerating gases, on the other hand, will be through valve V1 into line 24 and thence into reactor A. The spent regenerating gases from reactor A will flow through line 25 to valve V2 and thence into line 80, as previously described. The flow of the intermediate conversion products in line 56, employed as a heating and cooling medium to the reaction zones, will be through valve V3 into line 61 and thence into reactor A. The intermediate conversion products leaving reactor A flow through line 62, valve V4, into line 60, valve V3, into line 58, and thence into reactor B. The intermediate conversion products from reactor B are directed through line 59 and valve V4 into line 63, the flow thereafter being substantially as described.

Switching of the stream of hydrocarbon vapors and regenerating gases is periodically repeated by reversing the position of the switching valves so that the partially spent catalytic material in one reactor is being continuously regenerated, and the stream of hydrocarbon vapors is being continuously converted in the other reactor. The switching valves may be manually operated but, to simplify operation of the process and to avoid mistakes in the operation of the valves, all of the valves may preferably operate from a single time cycle controller of any well-known form in accordance with a definite predetermined schedule.

An example of one specific operation of the process is approximately as follows, although the invention should not be interpreted as limited exactly in accordance therewith.

Charging oil comprising a 28° A. P. I. gravity Mid-Continent topped crude was heated and fractionated to produce a light and heavy fraction. The light fraction was commingled with the intermediate conversion products from the thermal conversion step formed as hereinafter described, the mixture was heated to a temperature of 950° F. and the resulting vapors subjected to contact with silica-alumina-zirconia catalyst in a reaction zone heated as subsequently described. Simultaneously therewith the catalyst contained in another reaction zone was regenerated by contacting therewith heat regenerating gases containing approximately 2% by volume of oxygen while cooling this zone as subsequently described. The hydrocarbon conversion products from the catalytic reaction step were fractionated to separate gasoline boiling range hydrocarbons, intermediate conversion products, and heavy conversion products. The gasoline produced in this operation amounted to approximately 25% by volume of the fresh oil charged. The heavy conversion products, collected and separated as previously described, was commingled with the heavy conversion products from the thermal conversion treatment formed, as hereinafter described, and the mixture was commingled with the heavy fraction obtained by fractionation of the fresh oil charge. The resulting material was subjected to thermal cracking treatment in a heating coil and communicating reaction chamber at a temperature of 920° F. and at a superatmospheric pressure of 200 pounds per square inch on the outlet of the reaction chamber. The intermediate conversion products from the catalytic conversion step were heated to a temperature of 900° F. and contacted first with the exterior of the reaction zone in which the catalyst was undergoing regeneration to absorb a substantial portion of the heat produced in the regeneration reaction, after which said mixture was contacted with the exterior of the reaction zone in which the reactants were undergoing conversion to supply a substantial portion of the endothermic heat of conversion, following which the mixture was commingled with the products leaving the thermal conversion heater and the resulting mixture was introduced to the reaction chamber. The mixture of conversion products leaving the reaction chamber was introduced to a vaporizing and separating chamber wherein the non-vaporous liquid residue, corresponding to approximately 38% by volume of the fresh gas oil, was removed and separated from the vaporous conversion products and the latter was supplied to a fractionating zone to separate gasoline boiling range hydrocarbons, intermediate conversion products, and heavy conversion products. The gasoline withdrawn amounted to approximately 25% by volume of the fresh charging oil.

I claim as my invention:

1. A conversion process which comprises thermally cracking a relatively heavy hydrocarbon oil, simultaneously subjecting lighter hydrocarbon oil to catalytic cracking in a system comprising a pair of catalyst beds with each of which the lighter hydrocarbons are alternately contacted, one of the catalyst beds being employed in processing while the other is undergoing exothermic regeneration, separating from the products of the catalytic cracking a relatively heavy fraction of insufficiently converted hydrocarbons and a lighter fraction of insufficiently converted hydrocarbons, supplying at least a portion of said heavy fraction to the thermal cracking operation, passing at least a portion of said lighter fraction in indirect heat exchange relation with the catalyst bed undergoing regeneration and then with the catalyst bed being employed in processing and thereafter supplying the same to the thermal cracking operation.

2. The process as defined in claim 1 further characterized in that reflux condensate from the thermal cracking is supplied to the catalytic cracking as at least a part of said lighter oil.

3. A hydrocarbon oil conversion process which comprises fractionating the charging oil to separate therefrom a heavy cracking stock and a light cracking stock, thermally cracking said heavy stock and fractionating the resultant vapors, subjecting reflux condensate thus formed and said light stock to catalytic cracking in a system comprising a pair of catalyst beds with each of which the lighting hydrocarbons are alternately contacted, one of the catalyst beds being employed in processing while the other is undergoing exothermic regeneration, separating from the products of the catalytic cracking a relatively heavy fraction of insufficiently converted hydrocarbons and a lighter fraction of insufficiently converted hydrocarbons, supplying at least a portion of said heavy fraction to the thermal cracking operation, passing at least a portion of said lighter fraction in indirect heat exchange relation with the catalyst bed undergoing regeneration and then with the catalyst bed being employed in processing and thereafter supplying the same to the thermal cracking operation.

WAYNE L. BENEDICT.